United States Patent
Bryzek

[11] Patent Number: 6,079,406
[45] Date of Patent: Jun. 27, 2000

[54] APPARATUS FOR WARMING WATER IN AN ICE FISHING HOLE

[76] Inventor: Michael Bryzek, 23919 - 75th St., Paddock Lake, Wis. 53168

[21] Appl. No.: 09/226,330

[22] Filed: Jan. 6, 1999

[51] Int. Cl.[7] ..................................................... F23L 9/00
[52] U.S. Cl. ........................................ 126/271.1; 126/27
[58] Field of Search ......................... 126/271.1, 271.2 R

[56] References Cited

U.S. PATENT DOCUMENTS

| | | | |
|---|---|---|---|
| 2,677,363 | 5/1954 | Bryan | 126/4 |
| 2,747,569 | 5/1956 | Holm | 126/367 |
| 2,883,784 | 4/1959 | Obernolte | 43/4 |
| 2,990,829 | 7/1961 | McDonough et al. | 126/271.2 |
| 3,025,852 | 3/1962 | Quilling | 126/271.2 |
| 3,105,487 | 10/1963 | Anderson | 126/271.3 |
| 3,170,458 | 2/1965 | Anderlie | 126/271.3 |
| 3,171,404 | 3/1965 | Skog | 126/271.3 |
| 3,387,401 | 6/1968 | Stelmach | 43/17 |
| 3,555,827 | 1/1971 | Herr | 61/1 |
| 4,006,732 | 2/1977 | Schumm | 126/271.1 |
| 4,294,030 | 10/1981 | Stewart | 43/4 |
| 4,438,757 | 3/1984 | Anderson | 126/360 R |
| 4,747,226 | 5/1988 | Todd | 43/4 |
| 4,880,051 | 11/1989 | Ohashi | 126/271.1 |
| 5,154,015 | 10/1992 | Pecard | 43/4 |
| 5,157,855 | 10/1992 | Schmidt et al. | 43/17 |
| 5,282,333 | 2/1994 | Klinkhammer | 43/4 |
| 5,844,210 | 12/1998 | Dowdle | 126/271.1 |

*Primary Examiner*—Carroll Dority
*Attorney, Agent, or Firm*—Jansson, Shupe, Bridge & Munger, Ltd.

[57] ABSTRACT

An apparatus for warming water in an ice fishing hole. The apparatus includes a support, closed heat-transfer liquid conduit and heated liquid circulated throughout the conduit. The conduit includes at least one loop portion for extending along the ice edge substantially at the water level. Radiant heat energy from the loop portion warms water in the ice fishing hole. The novel design of the apparatus permits an angler to fish at the same time the apparatus operates to warm water in the ice fishing hole.

10 Claims, 3 Drawing Sheets

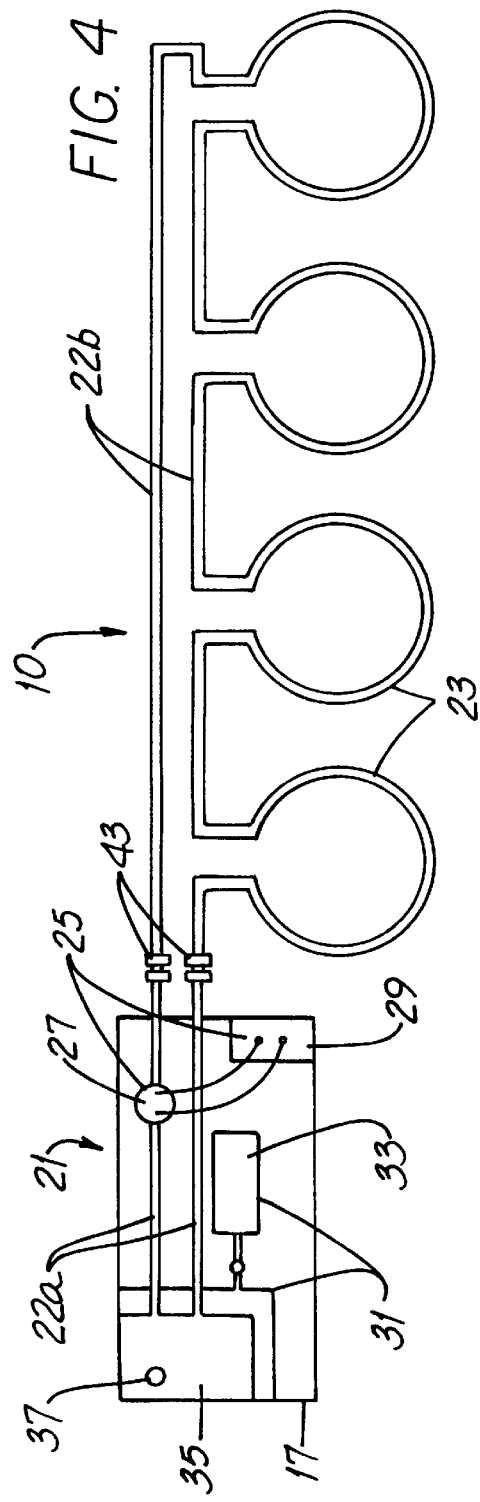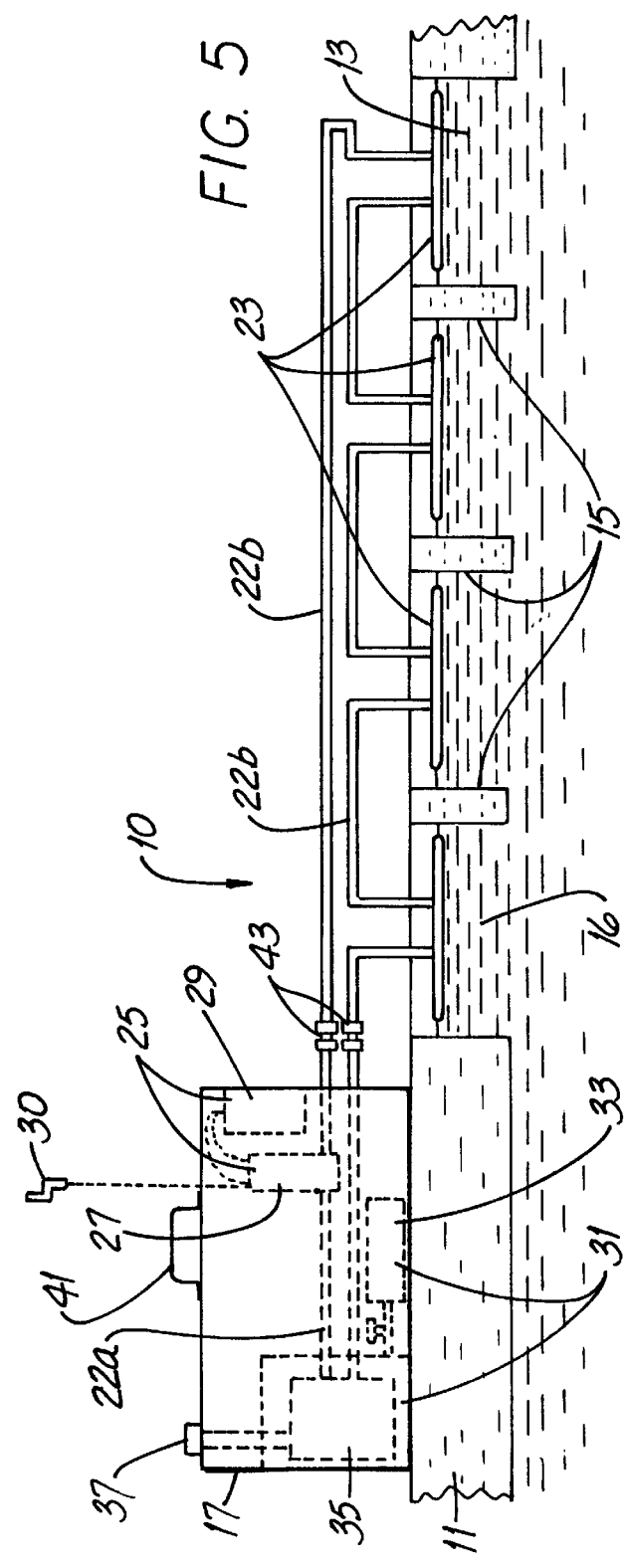

APPARATUS FOR WARMING WATER IN AN ICE FISHING HOLE

FIELD OF THE INVENTION

This invention is related generally to heat exchange devices and, more specifically, to an apparatus for warming water in an ice fishing hole.

BACKGROUND OF THE INVENTION

Ice fishing is a well known recreational and commercial activity. Ice Fishing is typically conducted in the winter when substantial amounts of ice form on bodies of water. The angler makes one more holes in the ice and places his or her fishing line and lure down through the hole and into the unfrozen water below. The angler then observes movement of the line, bomber or other detection device to determine if a fish has taken the bait. Once a fish takes the bait, the line is jerked back to set the hook.

Cold weather presents a substantial obstacle to the ice fisherman. Cold temperatures and wind can rapidly freeze water in the ice fishing hole. Freezing water in the hole decreases the hole diameter which can be problematic if a fish is caught which is larger than the hole diameter.

Freezing of water in the ice fishing hole can also make it more difficult for the angler to determine whether a fish is taking the bait. A fish strike is typically indicated by motion in the fishing line, bobber or other detection device. The motion is oftentimes very discrete and difficult to detect. Detection is made more difficult if ice forms on the fishing line, bobber or other detection device. The ice makes the line and bobber heavy and less responsive to fish-induced motion making a strike more difficult to detect.

Freezing of water in the ice fishing hole also presents a comfort or safety problem for the angler. Freezing of water forces the angler to periodically reach into the hole to break and remove the ice. This procedure is inconvenient and can adversely affect the angler particularly if his or her clothing is becomes wet.

An ice fishing device capable of continuously warming water in an ice fishing hole thereby making it easier to detect and catch fish would represent a substantial advance in the art.

OBJECTS OF THE INVENTION

It is an object of this invention to provide an improved apparatus for warming water in an ice fishing hole overcoming some of the problems and shortcomings of the prior art.

It is also an object of this invention to provide an improved apparatus for warming water in an ice fishing hole which permits the angler to fish while the apparatus is operating.

A further object is to provide an improved apparatus for warming water in an ice fishing hole which is easily portable.

Yet another object is to provide an improved apparatus for warming water in an ice fishing hole which is capable of warming water in ice fishing holes having different diameters.

These and other important objects will be apparent from the descriptions and drawings herein.

SUMMARY OF THE INVENTION

Briefly described, the present invention is an improved apparatus for warming water in an ice-fishing hole defined by an encircling ice edge. The apparatus includes a support member for placement on an ice surface, a heat generator secured with respect to the support member in a position leaving the hole accessible for fishing, and a closed heat-transfer liquid circulation conduit secured with respect to the support member and in fluid communication with the heat generator, the conduit having at least one loop for extending along the ice edge about the hole substantially at the water level. This novel combination permits radiant heat energy emitted from the loop to warm water in the ice fishing hole along the encircling ice edge while leaving the hole accessible for fishing.

In preferred embodiments, the support member comprises a rigid platform to rest atop the ice at positions about the hole. It is also preferred that the support member include at least one opening for positioning above the hole in substantial alignment therewith. In this preferred embodiment, the loop may be positioned and arranged for projection into the ice fishing hole offset from and substantially aligned with the opening.

The support member may be of any configuration capable of supporting the components of the invention while leaving the ice fishing hole accessible for fishing. Configurations of the support member may include a planar member, such as a sheet of wood, or a box-like member which houses the components within. In the latter arrangement, the heat-transfer liquid circulation conduit could be secured to the outer wall of the support member thereby supporting the conduit and permitting it to fit within the ice fishing hole.

Preferably, the invention includes circulating means secured with respect to the support member for moving the heat-transfer liquid within the loop. It is preferred that the circulating means comprise a motor-driven pump. Preferably, one or more batteries is/are secured with respect to the support member to drive the punmp. The pump need not be motor driven and may be operated manually be the angler.

It is also preferred that the heat generator include a heating chamber adjacent to, and in fluid communication with, the closed heat-transfer liquid circulation conduit. The heating chamber includes any structure, such as a plurality of coils, capable of holding the heat transfer liquid and being in fluid communication with the closed heat-transfer liquid circulation conduit. It is highly preferred that the heat generator further include a burner for producing a flame directed at the heating chamber.

Preferably, the loop and conduit is of ribbed substantially flexible tubing, thereby allowing some adjustment to accommodate varying ice-fishing holes. It should be understood that any material, such as metal or plastic tubing, would be suitable for the loop and/or conduit. Flexibility could be provided by the physical properties of the material used to construct the loop and conduit or by the ability to add or remove such material from the loop or conduit.

Such preferred invention also includes a method for warming water in an ice fishing hole.

BRIEF DESCRIPTION OF THE DRAWINGS

FIG. 4 is a top plan view of another embodiment of the warming apparatus.

FIG. 5 is a cross sectional view of another embodiment of the warming apparatus.

DETAILED DESCRIPTION OF PREFERRED EMBODIMENTS

Figure 1:
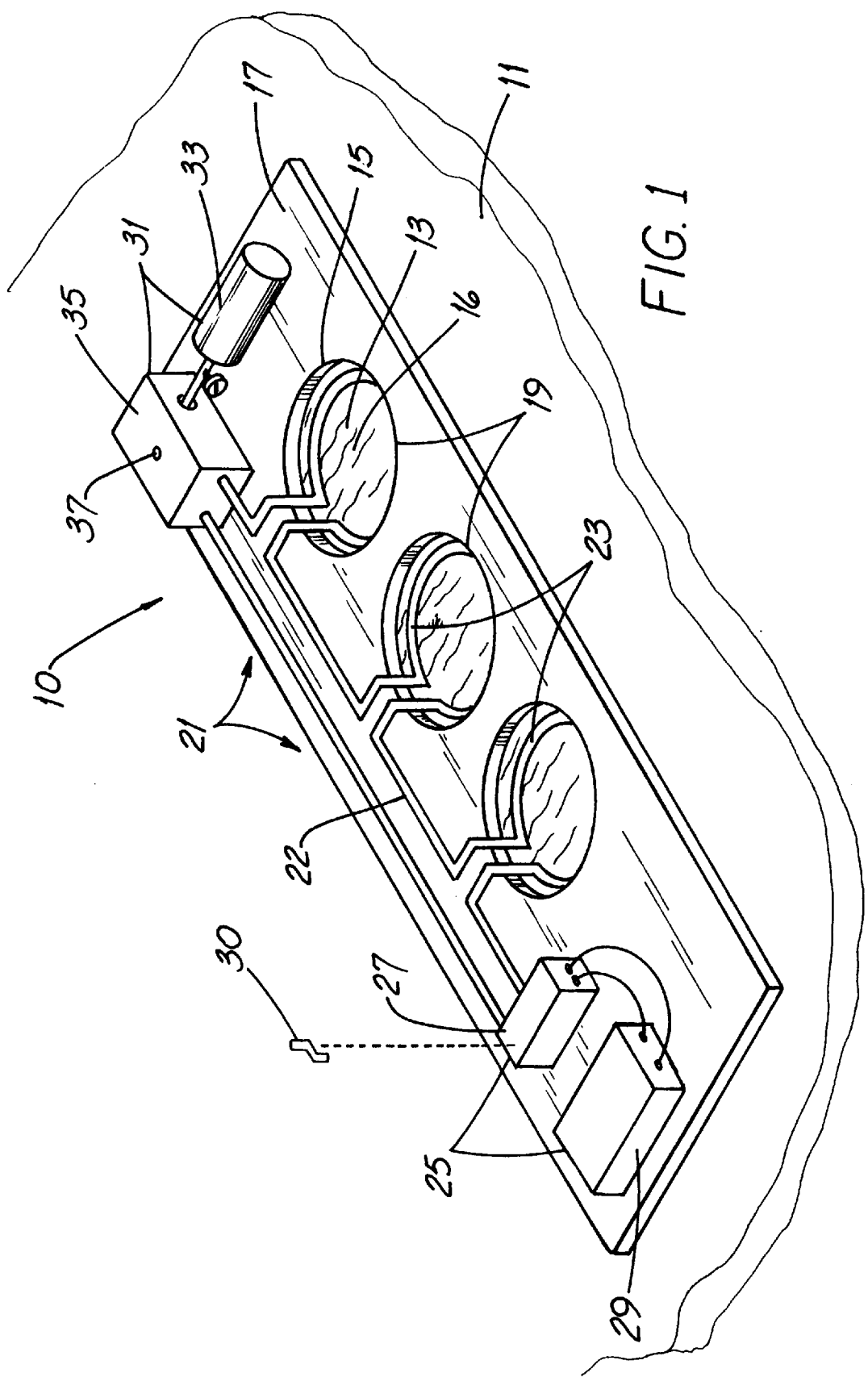
FIG. 1 is a perspective view of one embodiment of the warming apparatus.

FIG. 1 is a perspective view of one embodiment of the apparatus for warming water in an ice fishing hole 10. Warming apparatus 10 is intended to be place atop of ice 11 formed on the surface of a body of water. One or more holes 13 are made through the ice 11 each defined by an encircling ice edge 15.

Warming apparatus 10 includes a support member 17 for placement on the top surface of ice 11. Support member 17 may be a rigid platform such as the planar platform shown in FIG. 1. Other structures capable of supporting the components of the invention would also be acceptable such as the box-like structure 17 shown in FIGS. 4 and 5. Support member 17 may be made of wood or other comparable material such as plastic.

Support member 17 shown in FIG. 1 has three openings 19 formed therein. It is understood that the number of openings 19 may vary. Openings 19 are intended to be in substantial alignment with holes 13 in ice 11 and preferably have a diameter slightly less than holes 13. In operation it is possible to view unfrozen water 16 through holes 13 and openings 19.

Secured with respect to support member 17 is a closed heat transfer liquid circulation system 21. Heat transfer system 21 includes a closed conduit 22 which may be made of any suitable material such as ribbed substantially flexible tubing. Heat transfer system 21 includes at least one loop 23 extending along ice edge 15 substantially at the water level offset from and substantially aligned with each opening 19. Exemplary warming apparatus 10, as shown in FIG. 1, includes three loops 23. It is understood that invention 10 is not limited to three loops.

A heat transfer fluid (not shown) is disposed within heat transfer system 21. The fluid may consist of water, polyethylene glycol, olefins, methanol, ethanol or any other suitable heat transfer fluid. The heat transfer fluid is heated and circulated throughout heat transfer system 21.

Figure 2:
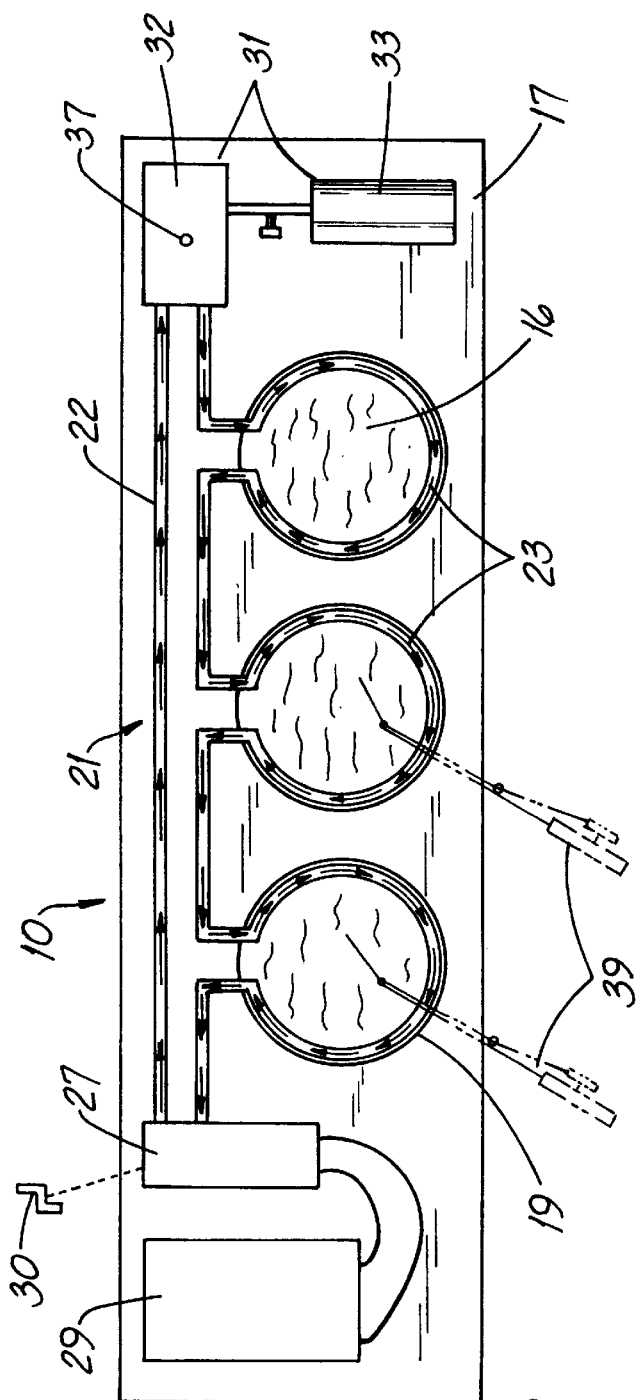
FIG. 2 is a top plan view of one embodiment of the warming apparatus.

FIG. 2 is a top planar view of one embodiment of warming apparatus 10. Support member 17, openings 19 and heat transfer system 21 are shown. Heat transfer system 21 and loops 23 may be made of ribbed substantially flexible tubing or any other suitable material such as plastic. Use of such tubing allows for some adjustment of loops 23 to accommodate varying ice fishing holes.

Heat transfer system 21 includes circulating means 25 secured with respect to support member 17 for moving heat transfer liquid within loops 23. Circulating means 25 may be a battery operated pump 27. Battery 29 is secured with respect to support member 17 to drive pump 27. Pump 27 may also be hand-operated as shown by the reference to crank 30.

Heat transfer system 21 further includes a heat generator 31 secured with respect to support member 17 in position to heat the heat transfer liquid. Heat generator 31 includes a chamber 35 and burner 33. Chamber 35 may include any suitable device, including coils, capable of holding heat transfer liquid. Burner 33 includes any device capable of generating heat such as a propane torch or other burner. Heat from burner 33 is directed onto heating chamber 35 which is adjacent to heat transfer liquid circulation system 21. Heat transfer fluid is warmed in heating chamber 35. Pressure relief valve 37 is included in heating chamber 35. Fishing poles 39 are shown to emphasize the fact that apparatus 10 may be used while fishing.

Figure 3:
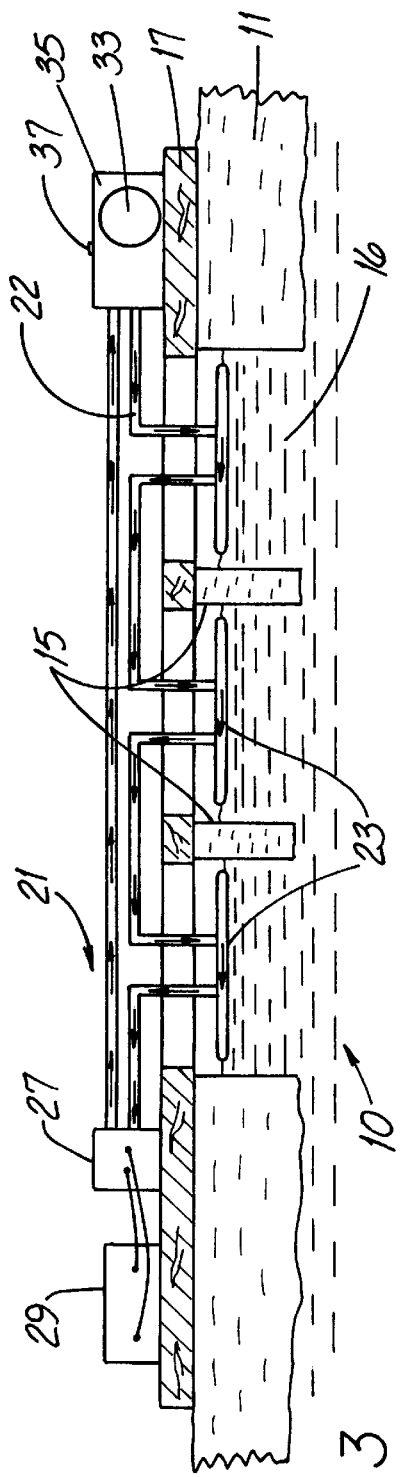
FIG. 3 is a cross sectional view of one embodiment of the warming apparatus.

FIG. 3 is a cross sectional view of one embodiment of warming apparatus 10. Support member 17, heat transfer system 21 and loops 23 are shown. Loops 23 are positioned and arranged for projection into the ice fishing holes 13 offset from and substantially aligned with each opening 19.

FIGS. 4 and 5 show another embodiment of the invention 10. In this embodiment, support member 17 is a box-like support member in which section components of heat transfer system 21 are positioned. Support member 17 may include handle 41 for ease in gripping support member 17.

Support member 17 is again positioned on ice surface 11. Pump 25, battery 29, burner 33 and chamber 35 are secured with respect to support member 17. Conduit 22b, including one or more loops 23, is removably connected to conduit 22a by couplings 43. Conduit 22a is also positioned within support 17.

In operation, support member 17 is placed on the top surface of ice 11. Circulation loops 23 are placed along ice edge 15 substantially at the level of water 16. Heat from torch 33 is directed onto heating chamber 35 which warms heat transfer fluid therein. Warmed heat transfer fluid is circulated through heat transfer system 21 and loops 23 by pump 27. Radiant heat energy emitted from each loop 23 warms water 16 in the ice fishing holes 13 along ice edges 15.

Consequently, water 16 in each ice fishing hole 13 remains substantially in a liquid state permitting the angler to fish through holes 13 notwithstanding inclement weather. The angler may fish at the same time that apparatus 10 is operating to warm water 16. Warming apparatus 10 prevents narrowing of fishing holes 13 due to freezing and inhibits ice from forming on the fishing line and the bobber making it easier to determine if a fish has taken the bait.

While the principles of this invention have been described in connection with specific embodiments, it should be understood clearly that these descriptions are made only by way of example and are not intended to limit the scope of the invention.

I claim:

1. In apparatus for warming water in an ice-fishing hole, the improvement comprising:

a support member for placement on an ice surface;

a heat generator secured with respect to the support member in a position leaving the hole accessible for fishing;

a closed heat-transfer liquid circulation conduit secured with respect to the support member and in fluid communication with the heat generator, the conduit having at least one loop for extending along the ice edge about the hole substantially at the water level;

whereby radiant heat energy emitted from the loop warms water in the ice fishing hole along the encircling ice edge while leaving the hole accessible for fishing.

2. The invention of claim 1 further including circulating means secured with respect to the support member for moving the heat-transfer liquid within the loop.

3. The invention of claim 2 wherein the circulating means comprises a motor-driven pump.

4. The invention of claim 3 further including a battery secured with respect to the support member to drive the pump.

5. The invention of claim 1 wherein the heat generator includes a heating chamber adjacent to, and in fluid communication with, the closed heat-transfer liquid circulation conduit.

6. The invention of claim 5 wherein the heat generator further includes a burner for producing a flame directed at the heating chamber.

7. The invention of claim 1 wherein the support member comprises a rigid platform to rest atop the ice at positions about the hole.

8. The invention of claim 7 wherein the platform includes an opening for positioning above the hole in substantial alignment therewith and the loop is positioned and arranged for projection into the fishing hole offset from and substantially aligned with the opening.

9. The invention of claim 1 wherein the loop and conduit is of ribbed substantially flexible tubing, thereby allowing some adjustment to accommodate varying ice-fishing holes.

10. A method for warming water in an ice fishing hole comprising:

placing a support member on an ice surface;

securing a closed heat-transfer liquid conduit with respect to the support member, the heat-transfer liquid circulation system having at least one loop for extending along the ice edge substantially at the water level;

positioning the circulation loop along the ice edge substantially at the water level;

circulating heated fluid within the conduit;

whereby radiant heat energy emitted from the loop warms water in the ice fishing hole along the encircling ice edge while leaving the hole accessible for fishing.

* * * * *